US008624757B2

(12) United States Patent
Schrauben

(10) Patent No.: US 8,624,757 B2
(45) Date of Patent: Jan. 7, 2014

(54) METHOD FOR VISUALLY INDICATING AN ADVISORY FROM THE TRAFFIC COLLISION AVOIDANCE SYSTEM ON A FLIGHT DISPLAY

(75) Inventor: Andrew Thomas Schrauben, Lowell, MI (US)

(73) Assignee: General Electric Company, Schenectady, NY (US)

( * ) Notice: Subject to any disclaimer, the term of this patent is extended or adjusted under 35 U.S.C. 154(b) by 297 days.

(21) Appl. No.: 13/169,676

(22) Filed: Jun. 27, 2011

(65) Prior Publication Data

US 2012/0326895 A1 Dec. 27, 2012

(51) Int. Cl.
*G08G 5/04* (2006.01)

(52) U.S. Cl.
USPC .......................... 340/951; 340/945

(58) Field of Classification Search
USPC ........................................ 340/961
See application file for complete search history.

(56) References Cited

U.S. PATENT DOCUMENTS

| 4,646,244 | A | * | 2/1987 | Bateman et al. | 701/301 |
|---|---|---|---|---|---|
| 4,792,799 | A | * | 12/1988 | Grove | 340/970 |
| 4,914,733 | A | | 4/1990 | Gralnick | |
| 5,179,377 | A | * | 1/1993 | Hancock | 340/961 |
| 5,185,606 | A | | 2/1993 | Verbaarschot et al. | |
| 5,248,968 | A | * | 9/1993 | Kelly et al. | 340/961 |
| 5,382,954 | A | * | 1/1995 | Kennedy et al. | 340/961 |
| 6,252,525 | B1 | * | 6/2001 | Philiben | 340/961 |
| 6,963,291 | B2 | * | 11/2005 | Holforty et al. | 340/945 |
| 8,395,533 | B2 | * | 3/2013 | Ganille et al. | 340/963 |
| 2002/0039070 | A1 | | 4/2002 | Ververs et al. | |
| 2003/0137444 | A1 | * | 7/2003 | Stone et al. | 342/30 |

FOREIGN PATENT DOCUMENTS

| DE | 19812037 A1 | 9/1999 |
|---|---|---|
| EP | 0456329 A1 | 11/1991 |
| EP | 0545473 A2 | 6/1993 |

OTHER PUBLICATIONS

Search Report and Written Opinion from corresponding EP Application No. 12173109.5-1803 dated May 31, 2013.

* cited by examiner

*Primary Examiner* — Travis Hunnings
(74) *Attorney, Agent, or Firm* — McGarry Bair PC

(57) ABSTRACT

A method of visually indicating an advisory from a traffic collision avoidance system (TCAS) on a flight display of an aircraft, the method comprising receiving a TCAS advisory, determining a severity of the received TCAS advisory, displaying a geometric body on the flight display in response to the TCAS advisory, and altering a shape of the displayed geometric body in response to the determined severity wherein the shape of the displayed geometric body may be altered by altering at least one of an angle and an arc of the geometric body.

20 Claims, 6 Drawing Sheets

US 8,624,757 B2

METHOD FOR VISUALLY INDICATING AN ADVISORY FROM THE TRAFFIC COLLISION AVOIDANCE SYSTEM ON A FLIGHT DISPLAY

BACKGROUND OF THE INVENTION

Traffic Alert and Collision Avoidance System (TCAS) advisories may be graphically displayed on a display located in the flight deck and may provide pilots and flight crews with information on the location of other aircraft in the vicinity. TCAS equipment transmits signals to transponder equipped aircrafts within its immediate vicinity and receives reply signals from the aircraft. By measuring the time intervals between the transmissions and the replies the TCAS can determine the relative range, bearing and altitude of the other aircraft(s). With this information the TCAS can determine a potential threat and will, if necessary, generate advisories on the TCAS display, with the advisories varying depending on the severity of the threat. The advisories may be graphically displayed as a generally trapezoidal shape that moves upwards and downwards on the TCAS display, with the location being indicative of the threat of the aircraft and where the threat of the aircraft is based upon the proximity, speed, climb rate, etc. of each aircraft. The generally trapezoidal shape may be designed to match the shape of the aircraft reference symbol and thus may not be entirely trapezoidal.

BRIEF DESCRIPTION OF THE INVENTION

In one embodiment, a method of visually indicating an advisory from a traffic collision avoidance system (TCAS) on a flight display of an aircraft includes receiving a TCAS advisory, determining a severity of the received TCAS advisory, displaying a geometric body on the flight display in response to the TCAS advisory, and altering a shape of the displayed geometric body in response to the determined severity wherein the shape of the displayed geometric body may be altered by altering at least one of an angle and an arc of the geometric body.

In another embodiment, a method of visually indicating an advisory from a traffic collision avoidance system (TCAS) on a flight display of an aircraft includes receiving a TCAS advisory, determining a severity of the received TCAS advisory, and displaying a geometric body with a fill style on the flight display in response to the TCAS advisory, wherein the fill style is set in response to the determined severity.

DESCRIPTION OF EMBODIMENTS OF THE INVENTION

Figure 1:
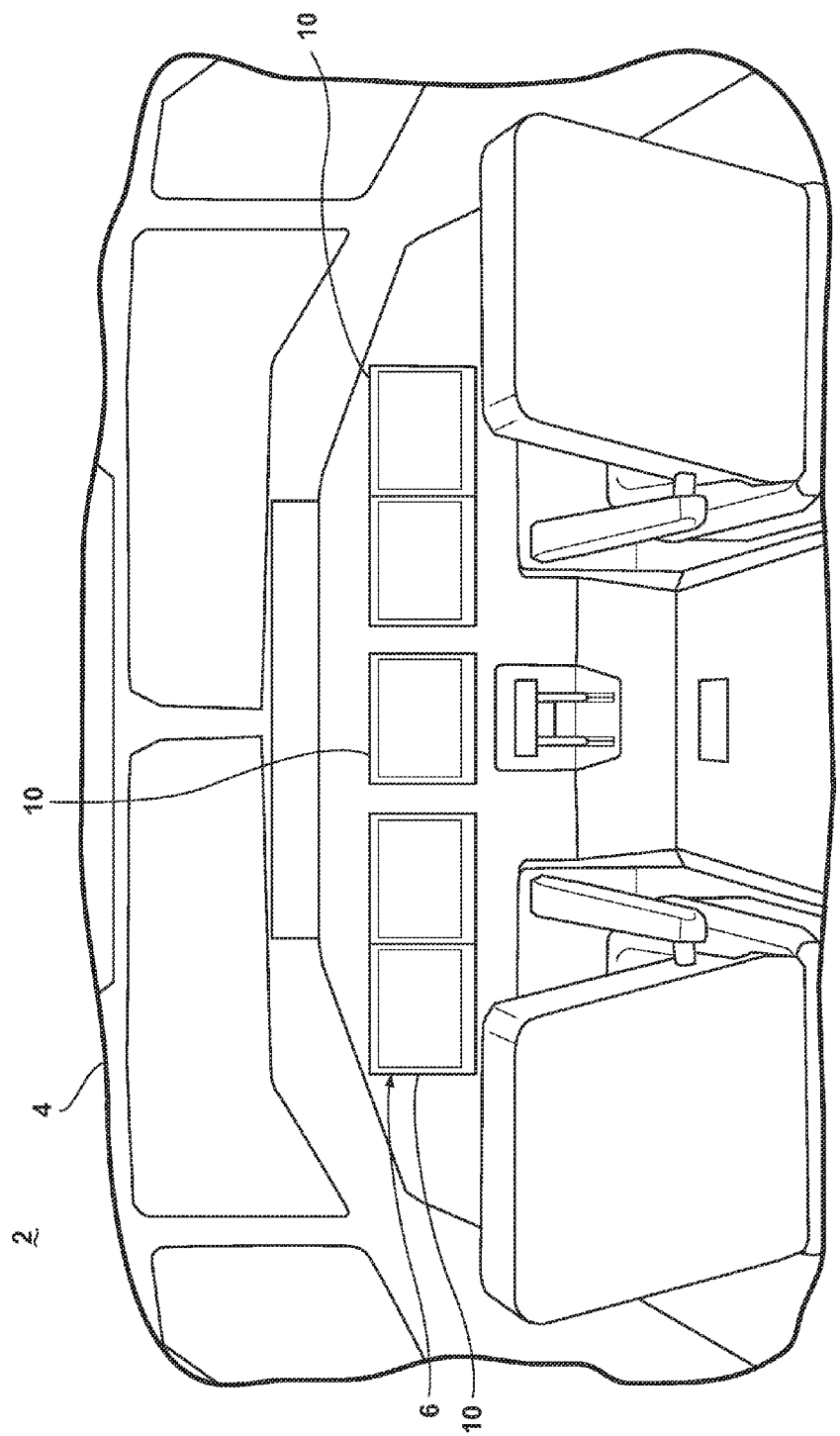
FIG. 1 is a perspective view of a portion of an aircraft cockpit with a flight deck known in the prior art.

FIG. 1 illustrates a portion of a prior art aircraft 2 having a cockpit 4 with a flight deck 6 having multiple flight displays 10. The multiple flight displays 10 may include primary and secondary flight displays any of which may be used to display to the pilot and flight crew a wide range of aircraft, flight, navigation, and other information used in the operation and control of the aircraft. TCAS information and advisories may be graphically displayed on any of the flight displays 10 located in the flight deck 6 to provide pilots and flight crews with information on the location of other aircraft in the vicinity.

Figure 2:
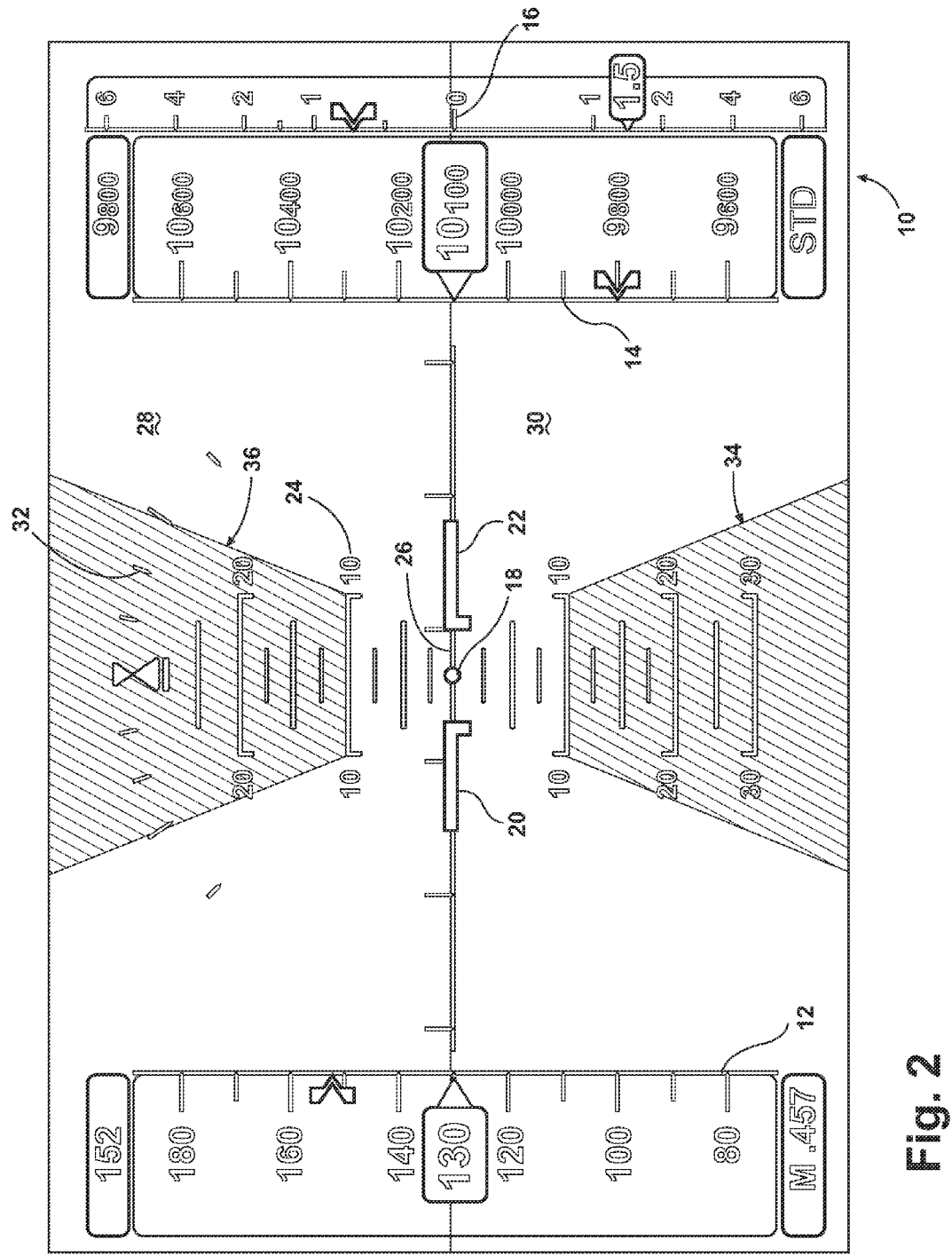
FIG. 2 is a front view of a flight display illustrating a first set of advisories from the TCAS according to the prior art, which may be used in the cockpit of FIG. 1.

FIG. 2 illustrates a prior art flight display 10, which may be used to visually indicate an advisory from the TCAS. The display 10 shows an air speed indicator 12, an altitude indicator 14, a vertical speed indicator 16, which are all illustrated as scales, and an aircraft reference symbol including a boresight 18 representing the aircrafts longitudinal axis at the center of the boresight 18 and conventional aircraft symbols 20 and 22 on either side thereof. A ladder 24 may represent the pitch scale and an artificial horizon may include a line 26 between an upper pitch scale area 28 and a lower pitch scale area 30. Both pitch scale areas 28, 30 may be differently colored to better assess the areas above and below the horizon line 26. A roll scale 32 may also be displayed.

A descent avoidance region 34 indicating a TCAS do not descend advisory includes a trapezoid symbol. An ascent avoidance region 36 indicating a TCAS do not climb advisory includes a similar trapezoid symbol. Both avoidance regions 34, 36 together define two pitch value ranges which should be avoided by the crew of the aircraft. Accordingly, the avoidance regions 34, 36 define in between them a region of values, which are allowed. Simultaneous with the presentation of the avoidance regions 34 and 36 additional information such as air speeds, altitudes, and vertical speed values which should be avoided or maintained may be displayed.

Figure 3:
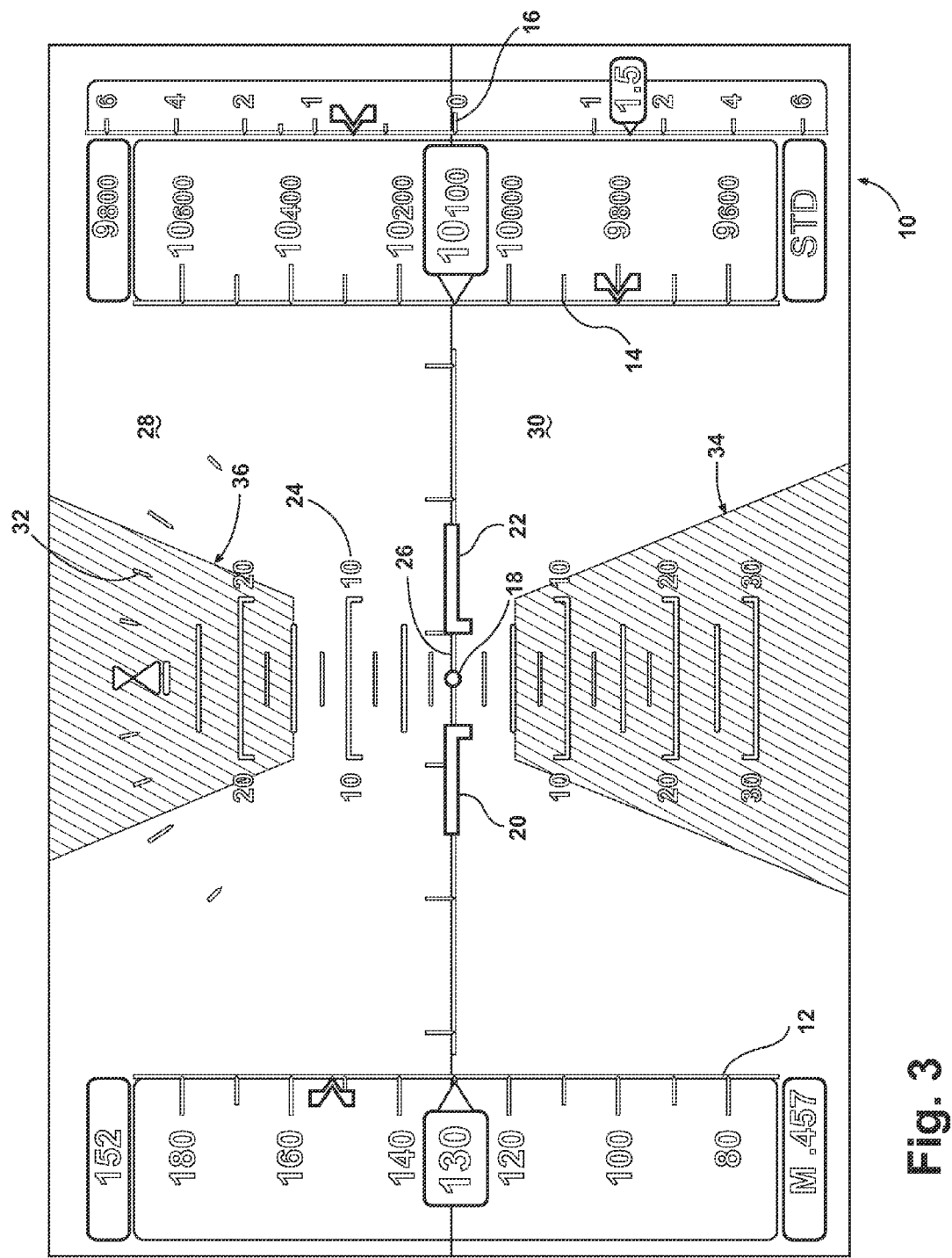
FIG. 3 is a front view of the prior art display of FIG. 2 illustrating the first set of advisories of FIG. 2 changed to show changed advisories from the TCAS according to the prior art.

FIG. 3 illustrates an additional prior art display where the descent avoidance region 34 is closer, in time, range, or altitude, to the aircraft than the ascent avoidance region 36. As such, the descent avoidance region 34 has moved up on the ladder 24 closer to the aircraft reference symbol. It may be seen that the avoidance regions 34 and 36 are static shapes that translate up and down according to the threat severity of other air traffic. It will be understood that the pilot will have to read the pitch scale to determine that the descent avoidance region 34 has moved and that the area to be avoided has changed. This may require additional scrutiny for the pilot to determine the relative proximity of each avoidance region 34 and 36 and the area that the aircraft should stay within.

Figure 4:
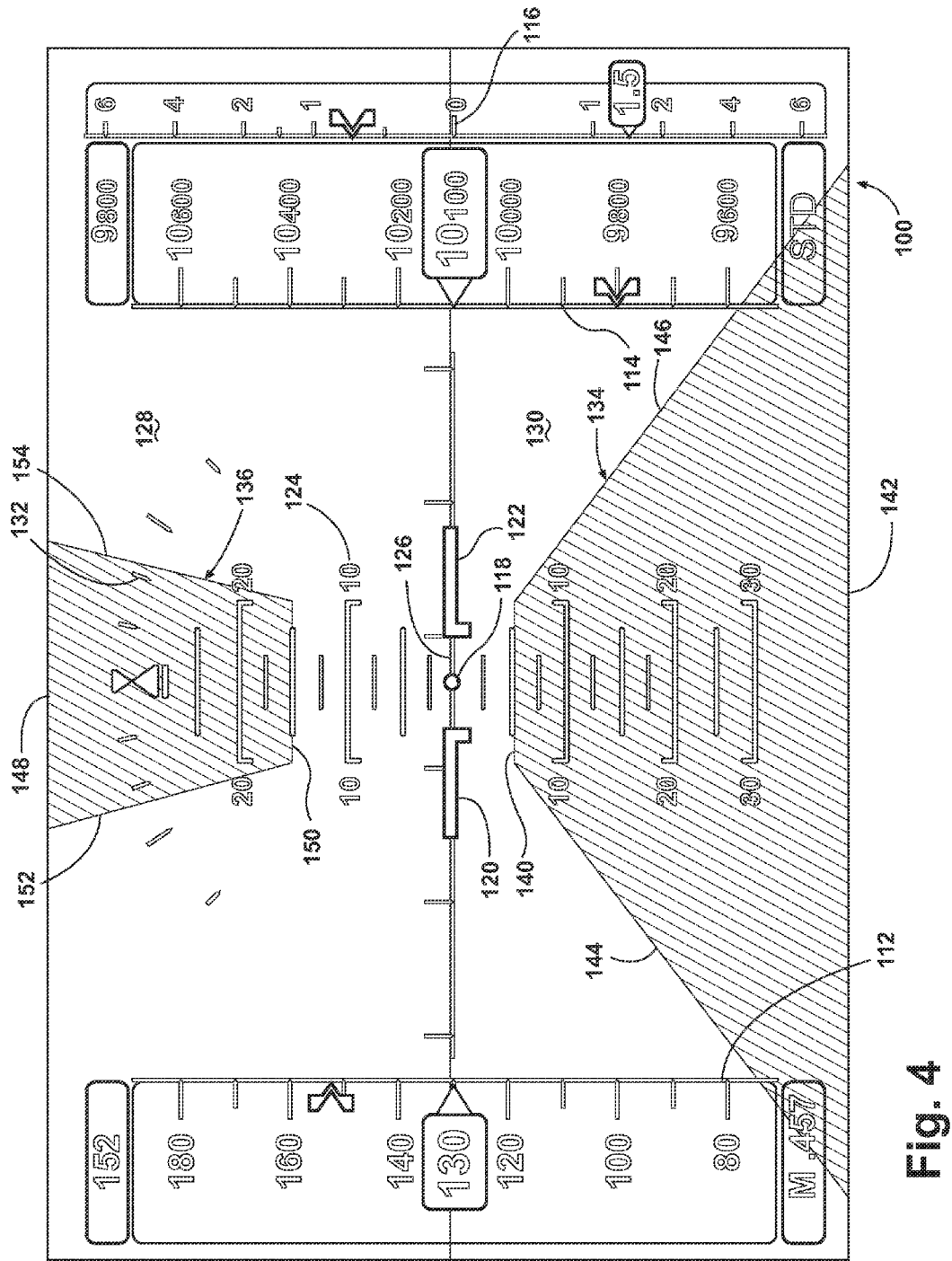
FIG. 4 is a front view of a flight display illustrating advisories from the TCAS according to a first embodiment of the invention.

The inventive method makes such a severity of an avoidance region or a difference between the avoidance regions easier to identify and react to. According to the first embodiment a method of visually indicating an advisory from the TCAS on a flight display includes receiving a TCAS advisory, determining the severity of the received TCAS advisory, displaying a geometric body on the flight display in response to a TCAS advisory, and altering at least one of an angle and an arc in the displayed geometric body in response to the determined severity. This may be easily seen in the flight display 100, illustrated in FIG. 4, wherein it is more clearly illustrated that a descent avoidance region 134 is closer to the aircraft than the ascent avoidance region 136 and that the angles of the geometric bodies forming the avoidance regions 134 and 136 are altered.

The flight display 100 illustrates a geometric body forming the descent avoidance region 134 indicating a do not descend advisory and a different and geometric body forming the ascent avoidance region 136 indicating a do not climb advisory. It is contemplated that the geometric bodies may include various shapes including polygons and that in the case of an increased severity of the advisory that such geometric bodies may be reshaped so that the pilot may more readily determine the threat of the avoidance regions. In the case of the polygon it is contemplated that such reshaping may include altering at least one angle of the polygon forming the avoidance region. It is contemplated that the geometric bodies representing the avoidance regions may be displayed on a flight display 100 that is a primary flight display. Thus, the geometric bodies may lay between the air speed indicator 112 and the altitude indicator 114 displayed on the primary flight display. It will be understood that any geometric shapes may be used for the descent avoidance region 134 and ascent avoidance region 136 including circular shapes or shapes having smooth curves or rounded corners in such cases it is contemplated that at least one arc of the geometric body may be altered in response to the determined severity.

More specifically, the geometric body forming the descent avoidance region 134 has been illustrated as a trapezoid having a cap 140, a shorter side, and base 142, a longer side, connected by opposing sides. The cap 140 may be parallel to the horizontal axis of the aircraft reference symbol and may be a straight line segment or shape that matches the aircraft reference symbol. The base 142 correlates to a horizontal line segment correlating to the bottom edge of the display. The opposing sides are formed by two auxiliary line segments 144 and 146. All of which are positioned such that together the cap 140, base 142, and line segments 144 and 146 define a base-down trapezoid.

The trapezoid forming the ascent avoidance region 136 is similarly shaped however it is considered a base-up trapezoid as its largest side, corresponding to a base 148 of the trapezoid, is at the upper edge of the display 100. Correspondingly, the lower portion of the trapezoid on the display may be considered the cap 150 of the trapezoid, which is parallel to the horizontal axis of the aircraft reference symbol. It also has two auxiliary line segments 152 and 154 which along with the base 148 and cap 150 define the base-up trapezoid. Thus, as described, the trapezoid is base-down when the TCAS advisory is for an aircraft at a lower altitude and base-up when the TCAS advisory is for an aircraft at a higher altitude.

As the aircraft at the lower altitude provides a greater severity advisory a shape of the geometric body is altered. More specifically, the interior angles connecting the cap 140 to the sides 144 and 146 are increased corresponding to the increased severity. When the severity is high at least a portion of the geometric body forming the avoidance region may overlap with at least a portion of the air speed indicator 112 and/or the altitude indicator 114, as may be seen in the illustrative descent avoidance region 134. As the aircraft at the higher altitude provides a less severe advisory the interior angles connecting its cap 150 to its sides 152, 154 are decreased correspondingly. It is contemplated that when the severity is low no portion of the geometric body forming the avoidance region overlaps with either the air speed indicator 112 or altitude indicator 114, as may be seen in the illustrative ascent avoidance region 136.

Both the descent avoidance region 134 and ascent avoidance region 136 may be displayed in a contrasting color, for instance a red color, indicating symbolically the "red area" which is not advisable. Alternatively, the avoidance regions 134, 136 may be, by way of non-limiting examples, shaded, crosshatched, outlined in a contrasting color, or filled with a semi-transparent color to contrast them from the remainder of the display 100. Both avoidance regions 134, 136 may underlie a portion of the pitch ladder 124. The values of the pitch scale surrounded by the avoidance regions 134, 136 are in the "red area" which should be avoided by the aircraft.

The above described inventive embodiment allows dynamic TCAS avoidance regions to be shaped in proportion to the aircraft's proximity to the avoidance regions indicating other aircrafts, creating a visual "floor" and "ceiling" effect to help guide the pilot during the TCAS resolution maneuver. It is contemplated that the avoidance regions 134, 136 may dynamically re-shape themselves in proportion to the aircraft's proximity to the region's limit to better inform the pilot of the severity of the advisories. In the illustrated example, the descent avoidance region 134 is shaped with a wider aspect to appear as if a "floor" is closer than the "ceiling" and this is further aided in the fact that the ascent avoidance region 136 appears more distant due to its narrower aspect.

Further, it has been contemplated that altering the avoidance region in response to the determined severity may occur when only a single advisory is being displayed on the flight display 100. Thus, it will be understood that the avoidance regions 134 and 136 may be shown independently of each of other if only one advisory is warranted and that such shapes may be re-shaped in the above described manner so that the severity of the advisories may be more readily determined. In such an instance and by way of non-limiting example, the angles connecting the cap with the sides of the trapezoid may be increased to show the increased severity of the advisory, which acts to increase the area of the trapezoid. Even with a single advisory such a re-shaping may aid in creating the "floor" or "ceiling" effect from which the pilot may more easily assess the values that are allowed.

Figure 5:
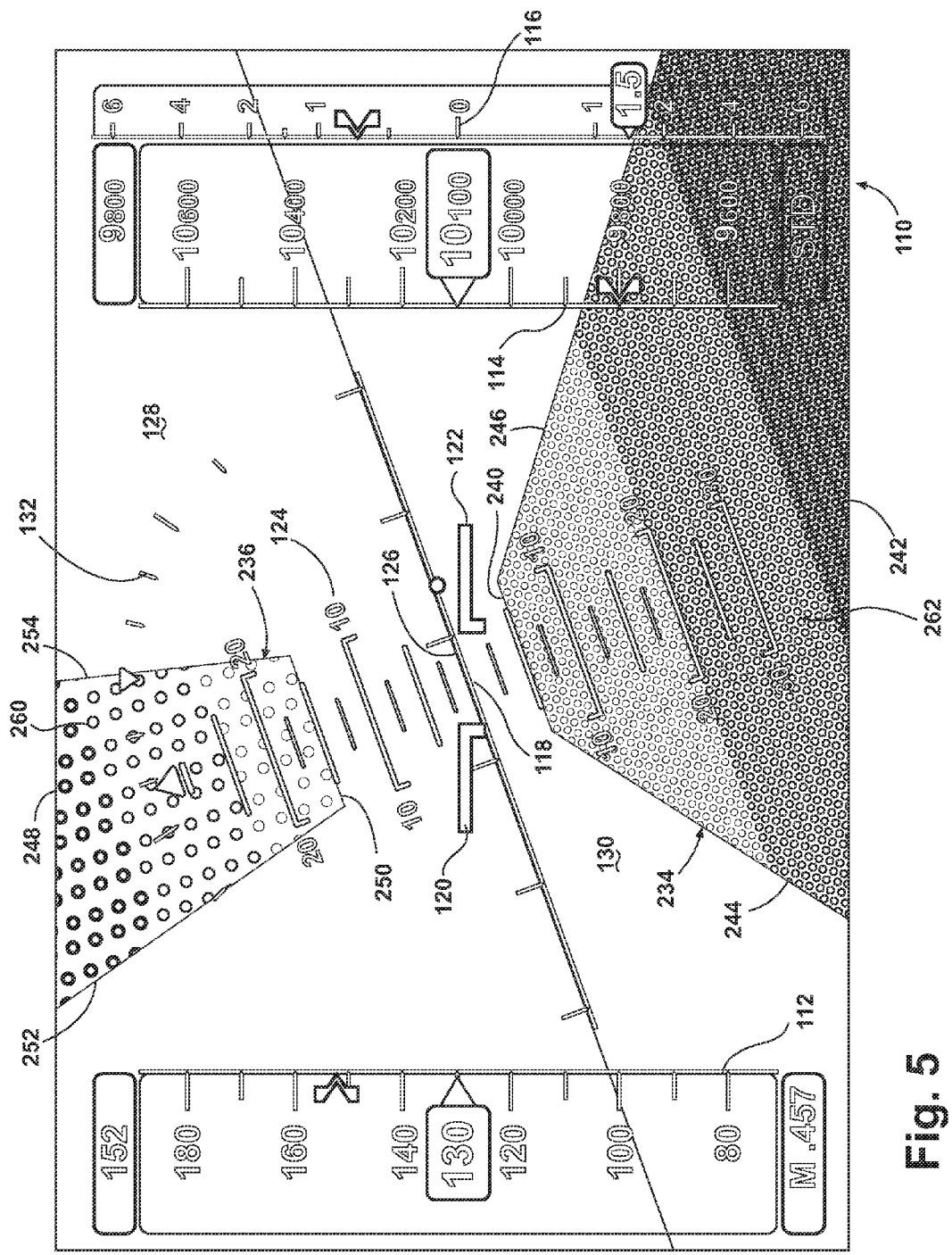
FIG. 5 is a front view of a flight display illustrating advisories from the TCAS according to a second embodiment of the invention.

FIG. 5 illustrates a descent avoidance region 234 and ascent avoidance region 236 according to a second embodiment, which may be displayed on the flight display 100. The descent avoidance region 234 and ascent avoidance region 236 have been displayed such that they rotate to remain aligned with the horizon, for example when the aircraft is in a left roll. Further, the fill styles of the avoidance regions 234 and 236 have been set according to the determined severities. More specifically, the fill styles may be set to have non-uniform fill styles, which may further be used to simulate the "floor" and "ceiling" effect and enhance the displayed avoidance regions 234 and 236. The ascent avoidance region 236 has been illustrated as being non-uniformly filled with a first symbol 260 while the descent region 234 has been illustrated as being non-uniformly filled with a second symbol 262. The non-uniform fill of the first and second symbols 260 and 262, in both cases, is due to the line thickness used to form the symbols 260 and 262; however, it is also contemplated that the non-uniformity may also occur because of spacing of the symbols 260 and 262 within the avoidance regions. It is contemplated that the non-uniform fill styles may alternatively include gradient shading, gradient transparencies, or non-uniform lines. The setting of the fill styles in response to the determined severity may be in addition to the changed shape of the advisories as shown or may be used in the alternative.

Figure 6:
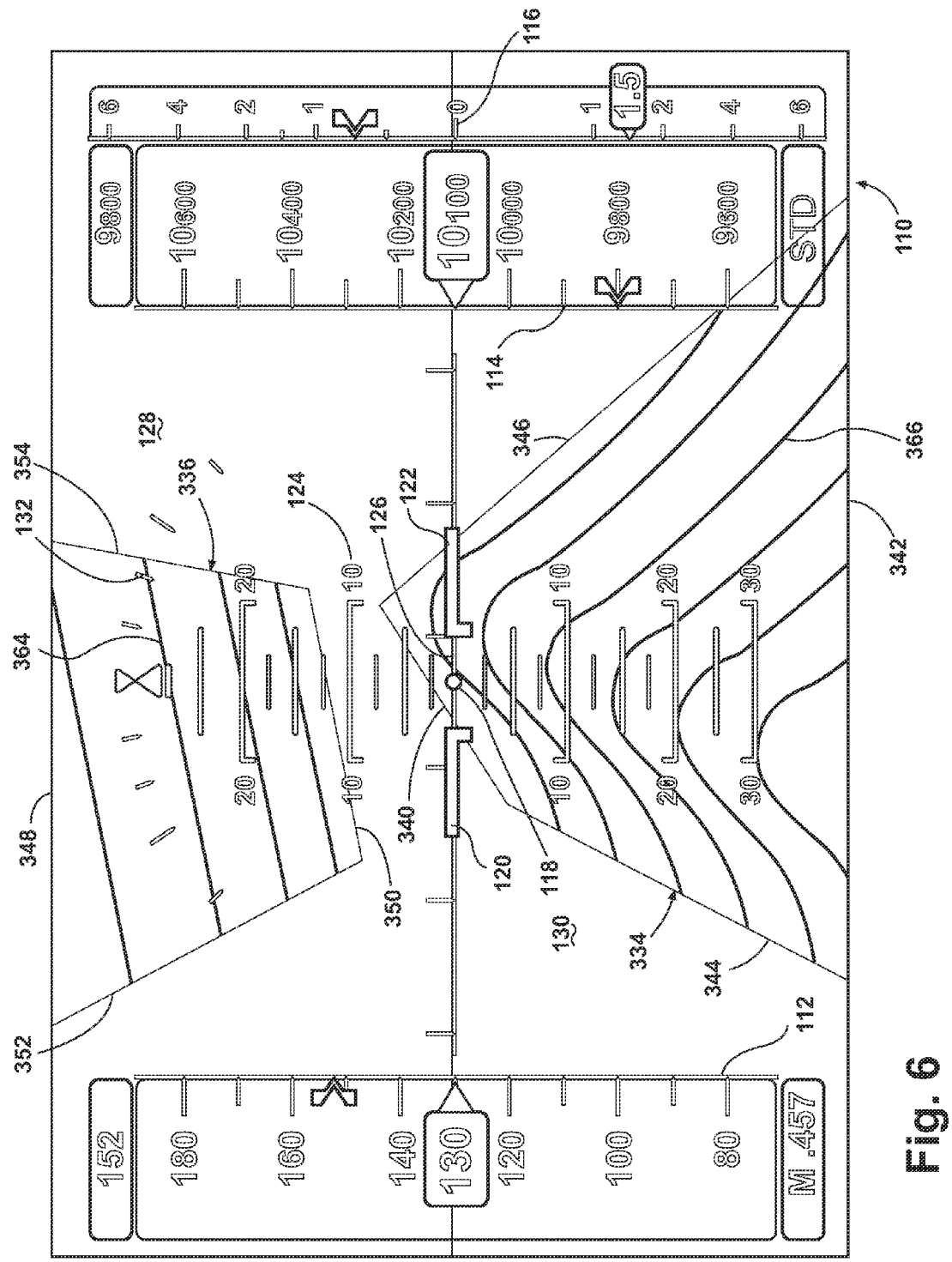
FIG. 6 is a front view of a flight display illustrating advisories from the TCAS according to a third embodiment of the invention.

FIG. 6 illustrates a descent avoidance region 334 and ascent avoidance region 336 according to a third embodiment, which may be displayed on the flight display 100. It will be understood that the geometric shapes forming the avoidance regions 334 and 336 may also be used to provide lateral guidance in addition to pitch guidance and that in such situations the avoidance regions 334 and 336 may be further reshaped to indicate an overall region to avoid that may include both vertical and lateral aspects. The avoidance regions 334 and 336 have been proportionally reshaped to illustrate the lateral threat severity and to indicate to the flight crew that a lateral maneuver should be made. It may be seen that the caps 340 and 350 of the avoidance regions 334 and 336, respectively, are no longer horizontal with the horizon. More specifically, the aircraft is illustrated as being in level flight and the avoidance regions 334 and 336 indicate that a climb and/or a left turn is required to escape the threat region.

Further, the avoidance regions 334 and 336 may include setting the graphical fill styles, which may alternatively be used to better simulate the "floor" and "ceiling" effect and enhance the displayed avoidance regions 334 and 336. The ascent avoidance region 336 has been illustrated as having a fill style that includes lines 364 having a variable spacing, which gives the user a similar effect of the perceived spacing of railroad ties when looking down a train track. The descent fill style of the avoidance region 334 includes contour lines 366, which may also be used to enhance the displayed avoidance region.

It will be understood that the above described embodiments aid in aerial navigation as the pilot's ability to perform a safe avoidance maneuver is improved. Advantages that may be realized include that a pilot may more readily determine the severity of the advisory and that the pilot may more readily determine the areas that are allowed and the areas which should be avoided. These advantages result in an improved safety margin.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of visually indicating an advisory from a traffic collision avoidance system (TCAS) on a flight display of an aircraft, the method comprising:
   receiving a TCAS advisory;
   determining a severity of the received TCAS advisory;
   displaying a geometric body having a shape on the flight display in response to the TCAS advisory; and
   reshaping the shape of the displayed geometric body in response to the determined severity
   by altering at least one of an angle and an arc of the geometric body.

2. The method of claim 1 wherein the geometric body comprises a polygon and at least one angle of the polygon is altered as the determined severity increases.

3. The method of claim 2 wherein the polygon is a trapezoid having a cap and base connected by opposing sides.

4. The method of claim 3 wherein when the severity increases interior angles connecting the opposing sides to the cap are both increased to increase a width of the trapezoid.

5. The method of claim 3 wherein the trapezoid is displayed base-down when the TCAS advisory indicates a threat below a current flight path and base-up when the TCAS advisory indicates a threat above a current flight path.

6. The method of claim 3 wherein when the severity decreases interior angles connecting the opposing sides to the cap are both decreased to decrease a width of the trapezoid.

7. The method of claim 1 wherein the geometric body is altered when the TCAS advisory indicates a threat that is at least one of lateral and vertical to a current flight path.

8. The method of claim 1 wherein the geometric body is displayed on a flight display that is a primary flight display.

9. The method of claim 8 wherein the geometric body lies between an air speed indicator and an altitude indicator displayed on the primary flight display.

10. The method of claim 9 wherein no portion of the geometric body overlaps with either the air speed indicator and altitude indicator when the severity is low.

11. The method of claim 9 wherein at least a portion of the geometric body overlaps with at least a portion of either the air speed indicator and altitude indicator when the severity is high.

12. The method of claim 8, further comprising a pitch ladder and wherein a portion of the geometric body underlies a portion of the pitch ladder.

13. The method of claim 1, further comprising altering a fill style of the geometric body in response to the determined severity.

14. A method of visually indicating an advisory from a traffic collision avoidance system (TCAS) on a flight display of an aircraft, the method comprising:
   receiving a TCAS advisory that indicates a threat that is at least one of lateral and vertical to a current flight path;
   determining a severity of the received TCAS advisory; and
   displaying a geometric body with a fill style on the flight display in response to the TCAS advisory;
   wherein the fill style is set in response to the determined severity.

15. The method of claim 14, wherein the fill style may be set as a non-uniform fill style in response to the determined severity.

16. The method of claim 15 wherein the non-uniform fill style includes at least one gradient transparencies, gradient colors, a varying pattern, and non-uniform lines.

17. The method of claim 14 wherein the geometric body with the fill style is displayed on a flight display that is a primary flight display.

18. A method of visually indicating an advisory from a traffic collision avoidance system (TCAS) on a flight display of an aircraft, the method comprising:
   receiving a TCAS advisory;
   determining a severity of the received TCAS advisory; and
   displaying a geometric body with a fill style on the flight display in response to the TCAS advisory;
   wherein the fill style is set as a non-uniform fill style in response to the determined severity in response to the determined severity.

19. The method of claim 18 wherein the non-uniform fill style includes at least one gradient transparencies, gradient colors, a varying pattern, and non-uniform lines.

20. The method of claim 18 wherein the TCAS advisory indicates a threat that is at least one of lateral and vertical to a current flight path.

* * * * *